Patented Dec. 11, 1934

1,984,093

UNITED STATES PATENT OFFICE 1,984,093

PREPARATION OF CELLULOSE NITRATE-ACYLATE

Cyril J. Staud and James T. Fuess, Rochester, N. Y., assignors to Eastman Kodak Company, Rochester, N. Y., a corporation of New York No Drawing. Application December 31, 1930, Serial No. 505,963

11 Claims. (Cl. 260—101)

This invention relates to a process of making cellulose nitrate-acylate by acylating in the known manner except that a liquefied higher oxide of nitrogen is present during the acylation.

One object of our invention is to provide a process of making cellulose nitrate-acylate by the use of the liquid higher oxides of nitrogen. Another object of our invention is to provide a process which permits better regulation of the contents of nitrogen and acylate in the molecule of the cellulose nitrate-acylate. Thus the amount of higher oxide of nitrogen used ($NO_2$) may be varied from 3% to 10% of the amount of acetic anhydride used so that the nitrogen content may be increased merely by increased addition of the particular nitrating agent.

Another object of our invention is to provide a process in which the nitrogen dioxide or other oxide used is easily handled. Those oxides or liquids whose boiling point is approximately that of room temperature will easily become gaseous unless properly handled. As is well known, these nitrogen gases are offensive to the individual. Another object of our invention is to provide a nitrating agent that is more economical than the nitrating agents ordinarily used. The material usually used for this purpose is nitric acid, and as is well known the cost of concentrating and producing makes this acid considerably higher than the liquefied oxides of nitrogen which are produced by condensation from the gaseous state.

Although we prefer to use $NO_2$ or its dimer $N_2O_4$ as the nitrating agent, the use of the trioxide $N_2O_3$ or the pentoxide $N_2O_5$ comes also within the contemplation of this invention and are all referred to herein as the higher oxides of nitrogen. The lower oxides $N_2O$ and $NO$ have such a low boiling point that they have been found to be unsuitable in a process of this nature. However, if a catalyst or a procedure should be found that would promote the nitration of cellulose acylate by these oxides at the low temperatures at which they are capable of use, it would obviously be possible to use them in this invention also. Except for the addition of the liquefied oxide of nitrogen the acylation step of the reaction is carried out by any of the known methods, in the presence of catalysts and the higher fatty acid anhydrides to form the cellulose acylate. However, other acylation reactions such as treatment with the acyl chlorides or the treatment with the fatty acids and an impelling agent or other acylation reactions known to the prior art can be used in this process if desired.

Although the acetate is the most common of the organic cellulose derivatives and acetic anhydride is, therefore, preferred to be used in this process, nevertheless other fatty acid anhydrides may be used instead of the acetic anhydride, for example, butyric anhydride, propionic anhydride, stearic anhydride and the like.

One embodiment of our invention is as follows: To about fifty grams of cotton linters or other cellulose material a mixture of about 300–400 grams of glacial acetic acid and a small amount (about 2 c. c.) of a mixed catalyst (1 part $H_2SO_4$:3 parts 95% $H_3PO_4$) is added and allowed to stand for about eighteen hours at about 20–25° C. This pretreated material is then placed in a machine which constantly rotates it at about the same temperature as before and about 150 grams of acetic anhydride are then added thereto following which liquid $NO_2$ is added to the mixture. As pointed out above, the preferred amount of $NO_2$ used is from 3% to 10%, of the amount of the acetic anhydride. A dope is quickly formed which, after the usual treatment of precipitation, washing and drying is found to be acetone-soluble cellulose nitrate-acetate.

It is to be noted that the temperature may be kept as high as possible with reference to the boiling point of the particular oxide of nitrogen that is being used. In the case of an oxide having a higher boiling point, it of course follows that a higher temperature may be used than is specified in the example given where $NO_2$ is used. If higher temperatures than the boiling point of the oxides of nitrogen used are desired, it is of course possible to carry out the reaction at such pressures as will raise the boiling point of the oxide of nitrogen employed to the desired temperature.

As pointed out previously any of the fatty acid groups may be attached to the cellulose instead of the acetyl group by the appropriate methods. Although we use cotton linters in the above example, it is to be understood that any other suitable form of cellulose may be used in this process such as, for example, scrap cotton cloth, fibers of cotton, alpha cellulose, linters containing more or less of the so-called beta and gamma cellulose, and high grade wood pulps such as sulphite pulp and super-alpha pulp, or pulps prepared from bagasse or other cellulosic fibers.

What we now claim as our invention and desire to be secured by Letters Patent of the United States is:

1. A process of making a cellulose nitrate-acylate which comprises acylating cellulose in the presence of a liquid nitrating agent selected from the group consisting of $NO_2$, $N_2O_4$, $N_2O_3$, and $N_2O_5$.

2. A process of making a cellulose nitrate-acylate which comprises acylating cellulose with a fatty acid anhydride in the presence of a known liquid oxide of nitrogen having a boiling point of approximately 3.5° C. or more.

3. A process of making cellulose nitrate-acylate which comprises acylating cellulose in the presence of a known liquid oxide of nitrogen having a boiling point of approximately 3.5° C. or more at a temperature below the approximate temperature at which this oxide will boil off from the acylating mixture.

4. A process of making cellulose nitrate-acetate which comprises acetylating cellulose in the presence of a known liquid oxide of nitrogen having a boiling point of approximately 3.5° C. or more at a temperature below the approximate temperature at which the oxide will boil off from the acetlyating mixture.

5. A process of making cellulose nitrate-acetate which comprises treating cellulose with a mixture comprising acetic anhydride, an esterification catalyst and a known liquid nitrogen oxide having a boiling point of approximately 3.5° or more.

6. A process of making cellulose nitrate-butyrate which comprises treating cellulose with a mixture comprising butyric anhydride and a known liquid nitrogen oxide having a boiling point of approximately 3.5° or more.

7. A process of making a cellulose nitrate-acylate which comprises acylating cellulose with a fatty acid anhydride and an esterification catalyst in the presence of liquid $NO_2$.

8. A process of making cellulose nitrate-acetate which comprises acetylating cellulose in the presence of liquid $NO_2$ at a temperature below 25° C.

9. A process of making cellulose nitrate-acetate which comprises treating cellulose with a mixture comprising acetic anhydride, an esterification catalyst and liquid $NO_2$.

10. A process of making a cellulose nitrate-acylate which comprises acylating cellulose and in the presence of a known liquid oxide of nitrogen having a boiling point of approximately 3.5° C. or more in an amount 3%–10% of the amount of acylating agent used.

11. A process of making a cellulose nitrate-acetate which comprises treating cellulose with a mixture comprising acetic anhydride, an esterification catalyst and a known liquid nitrogen oxide having a boiling point of approximately 3.5° C. or more in an amount from 3%–10% of the acetic anhydride used.

CYRIL J. STAUD.
JAMES T. FUESS.